(12) United States Patent
Yokota

(10) Patent No.: US 6,933,336 B2
(45) Date of Patent: Aug. 23, 2005

(54) GOLF BALL

(75) Inventor: Masatoshi Yokota, Kobe (JP)

(73) Assignee: SRI Sports Limited, Kobe (JP)

( * ) Notice: Subject to any disclaimer, the term of this patent is extended or adjusted under 35 U.S.C. 154(b) by 128 days.

(21) Appl. No.: 10/461,497

(22) Filed: Jun. 16, 2003

(65) Prior Publication Data

US 2003/0232934 A1 Dec. 18, 2003

(30) Foreign Application Priority Data

Jun. 18, 2002 (JP) ........................................ 2002-177592

(51) Int. Cl.$^7$ ............................................... A63B 37/12
(52) U.S. Cl. .................... 524/108; 524/280; 528/64; 473/373; 473/374; 473/377; 473/378
(58) Field of Search ................................ 524/108, 280; 473/373, 374, 377, 378; 528/64

(56) References Cited

U.S. PATENT DOCUMENTS

| 3,789,032 | A | * | 1/1974 | Hoeschele | ................ | 528/63 |
| 4,581,433 | A | * | 4/1986 | Potter et al. | ................ | 528/63 |
| 5,334,673 | A | | 8/1994 | Wu | | |
| 6,309,313 | B1 | * | 10/2001 | Peter | ................ | 528/64 |
| 6,486,261 | B1 | * | 11/2002 | Wu et al. | ................ | 525/332.6 |
| 2002/0052251 | A1 | * | 5/2002 | Iwami | ................ | 473/356 |

* cited by examiner

*Primary Examiner*—David J. Buttner
(74) *Attorney, Agent, or Firm*—Birch, Stewart, Kolasch & Birch, LLP

(57) ABSTRACT

The present invention provides a golf ball having a polyurethane cover, wherein the polyurethane cover is formed by curing a polyurethane cover composition which comprises an isocyanate group terminated polyurethane prepolymer comprising a specific alicyclic diisocyanate as a polyisocyanate component, and a specific phenylenediamine derivative as a curing agent.

17 Claims, No Drawings

GOLF BALL

BACKGROUND OF THE INVENTION

1. Field of the Invention

The present invention relates to a golf ball having a polyurethane cover, more particularly, to a golf ball which comprises a solid core and the polyurethane cover covering the solid core, and which exhibits an excellent durability and coloring-resistance against weather without lowering the productivity of the polyurethane cover.

2. Description of the Related Art

As a conventional golf ball, a wound-core golf ball having a "Balata" cover, or a multi-piece golf ball having an ionomer cover is well-known. The wound-core golf ball having a Balata cover is widely used by high-level golfers and professional golfers, because Balata cover is superior in feel and control. Herein, "feel" is the overall sensation to the golfer when the golf ball is hit, and "control" is to impart the motion such as backspin to the golf ball. However, the golf ball having a Balata cover is expensive due to a complicated manufacturing process and is inferior in durability and cut resistance. On the other hand, the golf ball having an ionomer resin cover is also widely used, because of good durability and flight-performance. However, it has been pointed out that the ionomer resin cover is inferior in feel and control to the Balata cover.

In view of these circumstances, a golf ball having a polyurethane cover has been proposed. It is expected that the golf ball having a polyurethane cover exhibits the feel and control which the Balata cover imparts as well as the durability and flight performance which the ionomer cover does.

The two-component type of the polyurethane cover is formed by curing a polyurethane cover composition comprising an isocyanate group terminated polyurethane prepolymer and a polyamine as a curing agent. In the two-component system, it is difficult to adjust the reactivity between the isocyanate group terminated polyurethane prepolymer and the polyamine, thus resulting in the problems of the productivity and the performance of the golf ball. For example, if the reactivity between the isocyanate group and the amino group is too high, the polyurethane cover composition will have the increased viscosity, and sometimes leads to the gelation. Thus, it is impossible to form the polyurethane cover. While if the reactivity is too low, it is necessary to spend longer time on curing the polyurethane cover composition, resulting in the lower productivity. For example, Japanese Patent No. 2,662,909 has disclosed that the reactivity between the isocyanate group terminated polyurethane prepolymer and the polyamine is adjusted by using a polyamine having a low reactivity. The above polyamine having a low reactivity is conventionally used for curing the aromatic polyisocyanate polyurethane prepolymer, such as 4,4'-diphenylmethanediisocyanate, which has a high reactivity. However, the polyurethane cover containing the aromatic polyisocyanate has low weather-resistance, thus yellowing of the polyurethane cover occurs.

The approach to overcome the yellowing of the polyurethane cover includes the use of the aliphatic or alicyclic polyisocyanate. However, since the cohesive energy of the aliphatic or alicyclic polyisocyanate is lower than that of the aromatic polyisocyanate, the use of the aliphatic or alicyclic polyisocyanate tends to lower the mechanical properties of the obtained polyurethane cover. Thus, if the aromatic polyisocyanate is just replaced with the aliphatic polyisocyanate or alicyclic polyisocyanate, the polyurethane cover with the satisfactory performances is not obtained. Further, as described above, if the polyamine having a low reactivity, which is conventionally used for the aromatic polyisocyanate, is applied for the aliphatic or alicyclic polyisocyanate, the reactivity of the polyamine is too low for the aliphatic or alicyclic polyisocyanate, resulting in the lowered productivity.

SUMMARY OF THE INVENTION

The present invention has been achieved to overcome the above problems. An object of the present invention is to provide a golf ball having the polyurethane cover, which exhibits excellent durability and coloring-resistance against weather without lowering the productivity of the polyurethane cover.

The present invention provides a golf ball having a polyurethane cover, wherein the polyurethane cover is formed by curing a polyurethane cover composition which comprises an isocyanate group terminated polyurethane prepolymer comprising at least one diisocyanate selected from the group consisting of 4,4'-dicyclohexylmethanediisocyanate, isophoronediisocyanate, and cyclohexanediisocyanate as a polyisocyanate component, and a phenylenediamine derivative represented by the following formula (1).

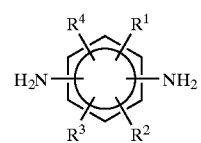

(1)

In the formula (1), $R^1$ to $R^4$ represent any one of an alkyl group having 1 to 3 carbons or hydrogen atom, and each of $R^1$ to $R^4$ may be same as or different from other.)

DETAILED DESCRIPTION OF THE PREFERRED EMBODIMENTS

The present invention provides a golf ball having a polyurethane cover, more preferably, a golf ball having the polyurethane cover which comprises a solid core and the polyurethane cover covering the solid core. The polyurethane cover used in the present invention is formed by curing a polyurethane cover composition which comprises an isocyanate group terminated polyurethane prepolymer (hereinafter may be just referred to as "isocyanate prepolymer") comprising at least one diisocyanate selected from the group consisting of 4,4'-dicyclohexylmethanediisocyanate, isophoronediisocyanate, and cyclohexanediisocyanate as a polyisocyanate component, and a phenylenediamine derivative represented by the following formula (1).

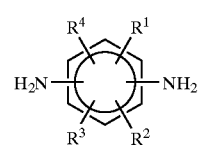

(1)

In the formula (1), $R^1$ to $R^4$ represent any one of an alkyl group having 1 to 3 carbons, or hydrogen atom, and each of $R^1$ to $R^4$ may be same as or different from other.

First of all, the isocyanate group terminated polyurethane prepolymer will be described. The isocyanate group terminated polyurethane prepolymer used for the present invention is not limited, as long as it has at least two isocyanate groups in a polyurethane prepolymer molecular chain and contains at least one diisocyanate selected from the group consisting of 4,4'-dicyclohexylmethanediisocyanate, isophoronediisocyanate, and cyclohexanediisocyanate as a polyisocyanate component. The location of each isocyanate group in a polyurethane prepolymer molecular chain is not particularly limited. The isocyanate group may be located at the terminal of the backbone chain or side chain of the polyurethane prepolymer molecular chain. In the present invention, at least one diisocyanate selected from the group consisting of 4,4'-dicyclohexylmethanediisocyanate, isophoronediisocyanate, and cyclohexanediisocyanate is used as a polyisocyanate component, because these diisocyanates do not cause yellowing, which the aromatic polyisocyanate dose. Among the above diisocyanates, 4,4'-dicyclohexylmethanediisocyanate(hydrogenated MDI) is preferable, because it enhances the resilience of the resultant polyurethane cover.

In a more preferable embodiment, the polyisocyanate component of the isocyanate group terminated polyurethane prepolymer essentially consists of at least one diisocyanate selected from the group consisting of 4,4'-dicyclohexylmethanediisocyanate, isophoronediisocyanate, and cyclohexanediisocyanate.

The isocyanate group terminated polyurethane prepolymer, without limitation, can further comprise a polyol component. For example, the isocyanate prepolymer can be obtained by reacting at least one diisocyanate selected from the group consisting of 4,4'-dicyclohexylmethanediisocyanate, isophoronediisocyanate, and cyclohexanediisocyanate with the polyol so that isocyanate group of the diisocyanate is excess to the hydroxyl group of the polyol in a molar ratio.

The polyol used for the isocyanate prepolymer may include any polyol, as long as the polyol has a plurality of hydroxyl groups. The polyol has no limitation on its molecular weight, and may include a low-molecular-weight polyol or a high-molecular-weight polyol.

The low-molecular-weight polyol includes, for example, a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. The high-molecular-weight polyol includes, for example, a polyether polyol such as polyoxyethyleneglycol (PEG), polyoxypropyleneglycol (PPG) and polyoxytetramethyleneglycol (PTMG); a polyester polyol such as polyethyleneadipate, polybutyleneadipate, polyhexamethyleneadipate (PMHA); a lactone polyester polyol such as ε-caprolactone; a polycarbonate diol such as polyhexamethylenecarbonate; and a polymer polyol such as an acrylic polyol. Among them, typically preferred is a polyether polyol, more preferably, a polyoxytetramethyleneglycol in view of imparting the superior resilience and water resistance to the resultant polyurethane cover.

Secondly, the phenylenediamine derivative represented by the following general formula (1) will be described below.

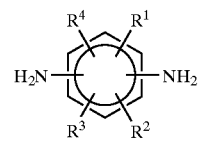

In the formula, $R^1$ to $R^4$ represent any one of alkyl group which has 1 to 3 carbons, or hydrogen atom, respectively, and each of $R^1$ to $R^4$ may be same as or different from other. In the present invention, the above phenylenediamine derivative is used as the curing agent for the isocyanate prepolymer in the polyurethane cover composition. The reason why the above phenylenediaminde derivative is used is that the reactivity thereof is suitable for the alicyclic polyisocyanate such as 4,4'-dicyclohexylmethanediisocyanate, isophoronediisocyanate, and cyclohexanediisocyanate. In a preferable embodiment, the curing agent for the isocyanate prepolymer essentially consists of the above phenylenediamine derivative represented by the formula (1).

The use of the phenylenediamine derivative makes the pot life of the polyurethane cover composition from 30 to 1,000 seconds, thereby improving the workability for curing the polyurethane cover composition. Further, since the use of phenylenediamine derivative provides the polyurethane cover with high resilience, it is possible to obtain the golf ball exhibiting the excellent fight performance. The reactivity of phenylenediamine derivative to isocyanate group is adjusted by the structure of the substituent groups of $R^1$ to $R^4$ bonded to the aromatic ring. In the present invention, the substituent group of $R^1$ to $R^4$ includes a hydrogen atom or alkyl group having 1 to 3 carbons. Each of $R^1$ to $R^4$ may be same as or different from other. The reason why the alkyl group having 1 to 3 carbons is used is that the reactivity of the amino group becomes too low, due to the large steric hindrance of the substituent groups, if having carbons of not less than 4. Also, it is preferable to use phenylenediamine derivative which is more reactive to the isocyanate group than 3,3'-dichloro-4,4'-diaminodiphenylmethane (MOCA). The halogen-substituted diaminodiphenylmethane such as MOCA, of which the reactivity to the isocyanate group is reduced by halogen-substitution, is suitable as a curing agent for the aromatic polyisocyanate. Thus, if the halogen-substituted diaminodiphenylmethane is used as a curing agent for the aliphatic or alicyclic polyisocyanate, the reaction therebetween is too slow. The relative reactivity of the phenylenediamine derivatives is, for example, described as follows ("Polyurethane Resin Handbook (Nikkan Kogyousya, Keiji, Iwata).

TABLE 1

Relative reactivities of phenylenediamine derivative to MOCA

| Structures of alkyl groups | Relative reactivity |
| --- | --- |
| 3,3'-dichloro-4,4'-DADPM(MOCA) | 1 |
| 1-methyl-2,4-phenylenediamine | 154 |
| 1-methyl-2,6-phenylenediamine | 105 |
| 1-methyl-3,5-diethylphenylenediamine | 31 |

Examples of the phenylenediamine derivative are phenylenediamine, monoalkylphenylenediamine derivative, dialkylphenylenediamine derivative, trialkylphenylenediamine derivative, and tetraalkylphenylenediamine derivative. Among them, it is preferable to use dialkylphenylenediamine derivative, trialkylphenylenediamine derivative and tetraalkylphenylenediamine derivative. It is easy to control the reactivity to isocyanate group by designing the numbers and the structure of the alkyl groups attached to the aromatic ring. The phenylendediamine derivative has no limitation on the location of the alkyl groups and amino groups, and includes, for example, 1,3-phenylenddiamine (m-phenylenediamine) derivative represented by the following formula (2), 1,4-phenylenediamine (p-phenylenediamine) derivative represented by the following formula (3), and 1,2-phenylenediamine (o-phenylenediamine) derivative represented by the following formula (4).

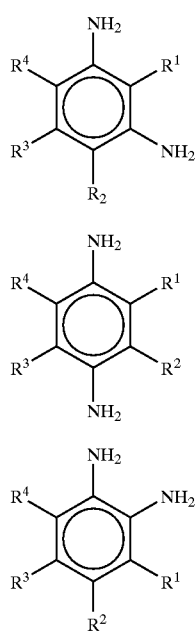

Among the above phenylenediamine derivatives, typically preferred is 1,3-phenylenediamine (m-phenylenediamine) derivative such as dialkyl, trialkyl, or tetraalky derivative of 1,3-phenylenediamine. Because it is easy to control the reactivity of 1,3-phenylenediamine derivative to the isocyanate group by designing the type of the substituent group attached to 2-, 4-, or 6-positions of the aromatic ring.

Examples of the 1,3-phenylenediamine derivative are 2,4,6-trimethyl-1,3-phenylenediamine, 2,4,6-triethyl-1,3-phenylenediamine, 2,4,6-tripropyl-1,3-phenylenediamine, 2,4-diethyl-6-methyl-1,3-phenylenediamine, 2,4-dipropyl-6-methyl-1,3-phenylenediamine, 2,4-dimethyl-6-ethyl-1,3-phenylenediamine, 2,4-dipropyl-6-ethyl-1,3-phenylenediamine, 2,4-dimethyl-6-propyl-1,3-phenylenediamine, 2,4-diethyl-6-propyl-1,3-phenylenediamine, 4,6-diethyl-2-methyl-1,3-phenylenediamine, 4,6-dipropyl-2-methyl-1,3-phenylenediamine, 4,6-dimethyl-2-ethyl-1,3-phenylenediamine, 4,6-dipropyl-2-ethyl-1,3-phenylenediamine, 4,6-dimethyl-2-propyl-1,3-phenylenediamine, 4,6-diethyl-2-propyl-1,3-phenylenediamine, 2,6-diethyl-4-methyl-1,3-phenylenediamine, 2,6-dipropyl-4-methyl-1,3-phenylenediamine, 2,6-dimethyl-4-ethyl-1,3-phenylenediamine, 2,6-dipropyl-4-ethyl-1,3-phenylenediamine, 2,6-dimethyl-4-propyl-1,3-phenylenediamine, and 2,6-diethyl-4-propyl-1,3-phenylenediamine. The above propyl group may include a normal propyl group (linear structure) and an isopropyl group (branched structure). The above phenylenediamine derivative can be used individually or as a mixture of at least two of them. For example, it is preferable to use a mixture of 2,4-diethyl-6-methyl-1,3-phenylenediamine and 4,6-diethyl-2-methyl-1,3-phenylenediamine. On the contrary, the phenylenediamine derivative, of which the alkyl group further contains sulfur, such as 6-methyl-2,4-dimethylthio-1,3-phenylenediamine and 2-methyl-4,6-dimethylthio-1,3-phenylenediamine, is not preferable in the present invention, because the reactivity to the isocyanate group is too low.

The polyurethane cover composition used in the present invention includes the above isocyanate group terminated polyurethane prepolymer and the above phenylenediamine derivative. The polyurethane cover composition is cured to form the polyurethane cover. The isocyanate group terminated polyurethane prepolymer and the phenylenediamine derivative are contained in the polyurethane cover composition in a molar ratio of the amino group to the isocyanate group ($NH_2$/NCO) preferably ranging from 0.70, more preferably from 0.80, even more preferably from 0.85, and preferably to 1.20, more preferably to 1.05, even more preferably to 1.00. If the ratio is less than 0.70, the amount of the isocyanate prepolymer to phenylenediamine derivative becomes excess, thus the alophanate or biruet bond tends to generate excessively. The excess alophanate or biruet bond causes the lack of softness of the resultant polyurethane cover. On the other hand, if the ratio is more than 1.20, since the isocyanate group is lacking, it becomes difficult to generate the alophanate or biruet bond. As a result, the amount of the three-dimensional crosslinking points becomes too low, resulting in the poor strength of the obtained polyurethane cover.

In the present invention, the polyurethane cover composition preferably has a pot life of not less than 30 seconds, more preferably not less than 50 seconds, and a pot life of not more than 1,000 seconds, more preferably not more than 600 seconds. Herein, the term "pot life" means a time period between the time the isocyanate prepolymer heated at 80° C. and the phenylenediamine derivative are mixed and the time when the viscosity of the polyurethane cover composition reaches 20,000 mPa·s (cPs). Furthermore, when the phenylenediamine derivative is mixed with the isocyanate prepolymer, the phenylenediamine derivative is supposed to be heated to the predetermined temperature (Curing agent adding temperature) prior to the mixing, and then mixed with the isocyanate prepolymer. For example, if the phenylenediamine derivative is liquid at the room temperature, it can be mixed at the room temperature. In the case that phenylenediamine derivative is solid at the room temperature, it may be heated around the temperature which is higher than the melting point thereof by 10 to 20° C., and then the phenylenediamine derivative in a liquid state may be mixed.

The pot life is an indicator of the reactivity of the curing reaction between the isocyanate prepolymer and the phenylenediamine derivative. If the pot life is shorter than 30 seconds, a sufficient operating time cannot be ensured, because the curing reaction is too fast. If the pot life is longer than 1,000 seconds, curing time becomes longer, resulting in the lowered productivity. The polyurethane cover composition preferably has the viscosity of not more than 20,000 mPa·s (cPs). If the viscosity is more than 20,000 mPa·s (cPs), the fluidity of the polyurethane cover composition is lowered, resulting in the lowered workability. The viscosity of the polyurethane cover composition can be measured by using a Brookfield type viscometer.

The polyurethane cover composition for use in the present invention may include the conventional catalyst which is well-known for the reaction of the polyurethane, in addition to the isocyanate prepolymer and the phenylenediamine derivative. Examples of the catalyst are a monoamine such as triethylamine and N,N-dimethylcyclohexyl amine; a polyamine such as N,N,N',N'-tetramethylethylene diamine and N,N,N',N",N"-pentamethyldiethylene triamine; a cyclic diamine such as 1,8-diazabicyclo[5,4,0]-7-undecene (DBU) and triethylene diamine; and a tin catalyst such as dibutyltin dilaurylate and dibutyltin diacetate. Among these catalysts, it is preferable to use 1,8-diazabicyclo[5,4,0]-7-undecene (DBU) and triethylene diamine.

The polyurethane cover composition may further contain a plasticizer, a solvent or the like. The use of the plasticizer or a solvent enables to control the reactivity of the curing reaction, the viscosity of the polyurethane cover composition, and the Shore D hardness of the resultant polyurethane cover easily. Examples of the plasticizer and the solvent are a phthalate plasticizer such as dibutylphthalate (DBP), and dioctyl phthalate (DOP); an adipate plasticizer such as dioctyl adipate (DOA); a sebacate plasticizer such as dioctyl sebacate (DOS), a phosphate plasticizer such as tricresylphosphate; an adipate type polyester; and propylene carbonate. Among them, propylene carbonate is preferable, because the propylene carbonate is excellent in the compatibility with the phenylenediamine derivative used in the present invention. As required, the polyurethane cover composition may further contain a filler such as barium sulfate, a pigment such as titanium dioxide, and other additives such as a dispersant, an antioxidant, an ultraviolet absorber, a light stabilizer, and a fluorescent material or a fluorescent brightener, unless they impair any undesirable property to the intended golf ball.

The golf ball of the present invention can be obtained by covering a solid core with the above polyurethane cover composition, and then curing the polyurethane cover composition. The conditions for curing the polyurethane cover composition depend on the each type of the isocyanate prepolymer and the phenylenediamine derivative. In general, the polyurethane cover composition is preferably cured at the temperature between the room temperature and 140° C., for 1 to 60 minutes. By curing at the above condition, it is possible to reduce the influence of forming the polyurethane cover on the molded-rubber and improve the productivity and workability.

The polyurethane cover preferably has a Shore D hardness of not less than 30, more preferably not less than 35, and a Shore D hardness of not more than 60, more preferably not more than 55. If the polyurethane cover has the Shore D hardness of larger than 60, the polyurethane cover becomes too hard, resulting in the larger impact upon shot. Further, the controllability of the obtained golf ball becomes poor, due to the lower spin rate. On the other hand, if the polyurethane cover has a Shore D hardness of less than 30, the polyurethane cover will be too soft, resulting in the low resilience.

The polyurethane cover preferably has the thickness of not less than 0.2 mm, more preferably not less than 0.3 mm, and preferably not more than 1.5 mm, more preferably not more than 1.3 mm. By making the thickness of the polyurethane cover thinner than 1.5 mm, which is thinner than that of the conventional cover, it is possible to prevent the resilience from being lowered by employing the relatively soft polyurethane cover. However, if the thickness of the polyurethane cover is less than 0.2 mm, since the thickness is too thin, it will be difficult to form the polyurethane cover. Even if the polyurethane cover having the thickness of less than 0.2 mm can be formed, the tear-strength of the resultant polyurethane cover is low. Thus, the polyurethane cover is easily torn or worn by the impact or contact with the clubface. In extreme cases, the solid core would be exposed.

In the following, the solid core used in the present invention will be described. The solid core has no limitation on its structure, and may have single-layered structure, or multi-layered structure which comprises a center and at least one intermediate layer covering the center. The solid core with single-layered structure or the center of the multi-layered solid core, for example, without limitation, is preferably a molded body which is formed by vulcanizing a rubber composition. The rubber composition preferably comprises a base rubber, an organic peroxide as a crosslinking agent, and a co-crosslinking agent. Examples of the base rubber are butadiene rubber (BR), ethylene-propylene-diene terpolymer (EPDM), isoprene rubber (IR), styrene-butadiene rubber (SBR), and acrylonitrile-butadiene rubber (NBR). Among them, butadiene rubber, particularly cis-1,4-polybutadiene, is preferable in view of its superior repulsion property. A preferred embodiment of the present invention employs a high cis-polybutadiene rubber having cis-1,4 bond in a proportion of not less than 40%, preferably not less than 70%, more preferably not less than 90%.

The co-crosslinking agent used in the present invention includes, for example, an α,β-unsaturated carboxylic acid or a metal salt thereof. Typically preferred is the α,β-unsaturated carboxylic acid having 3 to 8 carbon atoms such as acrylic acid and methacrylic acid or the metal salt thereof. As the metal forming, the metal salt of the α,β-unsaturated carboxylic acid, a monovalent or divalent metal such as zinc, magnesium, calcium, aluminum and sodium is preferably used. Among them, zinc is preferable, because it can impart the higher repulsion property to the golf ball. The amount of the co-crosslinking agent to be blended in the rubber composition is preferably from 20 to 50 parts by mass, more preferably 25 to 40 parts by mass based on 100 parts by mass of the base rubber.

Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. The amount of the organic peroxide to be blended in the rubber composition is preferably from 0.2 to 1.5 parts by mass, more preferably from 0.3 to 1.0 parts by mass based on 100 parts by mass of the base rubber.

The rubber composition used in the present invention may further contain an organic sulfur compound in addition to the base rubber, the co-crosslinking agent, and the crosslinking agent. Examples of the organic sulfur compound is a diphenyl disulfide derivative represented by the following formula (5):

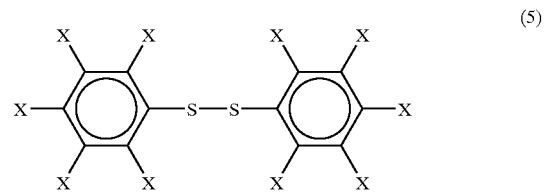

wherein "X" represent any one selected from the group consisting of a hydrogen atom, a fluorine atom, a chlorine atom, a bromine atom, an iodine atom, and a cyano group, and each of "X" may be same as or different from other. Examples of the preferable organic sulfur compound are diphenyldisulfide, or pentachloro diphenyl disulfide. As required, the rubber composition may further contain a specific gravity adjusting agent such as zinc oxide and barium sulfate, an antioxidant, a color powder, and the like.

The solid core with single-layered structure or the center is formed by press-molding the above rubber composition into the spherical body at the heating conditions. The conditions for the press-molding should be determined depending on the rubber composition, but the press-molding is preferably carried out for 10 to 60 minutes at the temperature of 130 to 200° C. Alternatively, the press-molding is preferably carried out in a two-step heating, for example, for 20 to 40 minutes at the temperature of 130 to 150° C., and continuously for 5 to 15 minutes at the temperature of 160 to 180° C.

In the case of the multi-layered solid core, the intermediate layer covering the center has no limitation on its raw material. For example, a rubber composition, or a thermoplastic resin can be used. As a rubber composition for the intermediate layer, the rubber composition described above for the solid core or the center can be used. In the case of using the thermoplastic resin for the intermediate layer, an ionomer resin, a polyester elastomer, a polyurethane elastomer, a polystyrene elastomer, or a polyamide elastomer can be used. The ionomer resin includes "Himilan" available from Mitsui-Dupont Co., "Surlyn" available from Dupont Co., "Iotex" available from Exxon and the like.

An example of the polyester elastomer is "HYTREL" available from DU PONT-TORAY Co., LTD. An Example of the polyurethane elastomer is "ELASTOLLAN" commercially available from BASF POLYURETHANE ELASTOMERS Co. An example of the polystyrene elastomer is "Septon" available from Kuraray Co. An example of the polyamide elastomer is "PEBAX" commercially available from Toray Industries, Inc. The above thermoplastic resin and elastomeres can be used individually or as a mixture of some of them. Among them, the ionomer resin is particularly preferable because of imparting superior repulsion property and durability. Examples of the jonomer resin are one prepared by neutralizing at least a part of carboxyl groups in a copolymer composed of olefin and $\alpha,\beta$-unsaturated carboxylic acid with a metal ion, and one prepared by neutralizing at least a part of carboxyl groups in a terpolymer composed of olefin, $\alpha,\beta$-unsaturated carboxylic acid and $\alpha,\beta$-unsaturated carboxylic acid ester with a metal ion. Examples of the $\alpha,\beta$-unsaturated carboxylic acid are acrylic acid, and methacrylic acid. Examples of the $\alpha,\beta$-unsaturated carboxylic acid ester are methyl ester, ethyl ester, propylester, n-butylester, isobutylesterandthelike of acrylic acid, methacrylic acid. The metal for neutralizing the carboxyl group includes alkali metal such as sodium, potassium, and lithium; or alkali earth metal such as magnesium, calcium; or divalent transition metal such as zinc, and copper. Further, the above ionomer resin can be used as the mixture thereof in order to obtain the desired resilience and hardness.

The intermediate layer may further include a filler such as barium sulfate, a colorant such as titanium oxide, and an additive such as a dispersant, an antioxidant, an UV absorbent, a light stabilizer, and a fluorescent brightener, in addition to the base component such as the rubber and the thermoplastic resin.

In the case of using the thermoplastic resin, the method to cover the center with the intermediate layer, without limitation, includes an injection-molding method or a compression-molding method, by which it is possible to cover the center with the thermoplastic resin. In the case of using the rubber composition for the intermediate layer, the center is covered with the rubber composition and then subjected to the vulcanizing-molding.

The intermediate layer has preferably a Shore D hardness of not less than 30, more preferably not less than 35, and a Shore D hardness of not more than 80, more preferably not more than 75. If the intermediate layer has a Shore D hardness of less than 30, the intermediate layer is too soft, resulting in lowering the resilience. On the other hand, if the intermediate layer has a Shore D hardness of more than 80, the intermediate layer becomes too hard, resulting in the bad shot feeling.

Further, the intermediate layer preferably has a thickness of not less than 0.5 mm, more preferably not less than 0.7 mm, and a thickness of not more than 4.5 mm, more preferably no more than 4 mm. If the thickness is less than 0.5 mm, the resilience becomes low, while if the thickness is larger than 4.5 mm, the shot feeling becomes bad.

The solid core used in the present invention preferably has a diameter of not less than 39.8 mm, more preferably not less than 40.2 mm, and a diameter of not more than 42.4 mm, more preferably not more than 42.2 mm. The solid core preferably has the deformation amount of not less than 2.20 mm, more preferably not less than 2.30 mm, and a deformation amount of not more than 3.50 mm, more preferably not more than 3.30 mm, when applying a load from 98N (10 kgf) as an initial load to 1275N (130 kgf) as a final load.

In the present invention, since the polyurethane cover is so thin, the hardness of the solid core affect the shot feeling to a considerable extent. If the deformation amount is less than 2.20 mm, a larger impact will be given to the golfer upon shot, due to the hardness. On the other hand, if the deformation amount is more than 3.50 mm, the solid core becomes too soft, resulting in the lower resilience and the heavy shot feeling upon shot.

Generally, the polyurethane cover is formed with a plurality of dimples. In the present invention, since the polyurethane cover is very thin, the polyurethane cover becomes extremely thin at the bottom of the dimple when the surface of the solid core is flat. As a result, the durability of the polyurethane cover is lowered at the bottom of the dimple. Therefore, it is preferable to form the dimple at the surface of the solid core concavely at the same location where the dimple is formed on the polyurethane cover. This makes the thickness of the polyurethane cover constant, thereby ensuring the durability of the polyurethane cover at the bottom of the dimple.

In the present invention, the polyurethane cover can be produced by employing a conventional method for manufacturing the golf ball having the polyurethane cover. For example, the polyurethane cover composition is charged into the hemispherical mold where the solid core is held, and then the hemispherical mold is inverted to mate with another hemispherical mold, into which the same polyurethane cover composition has been charged. Then, the polyurethane cover composition is cured to form the polyurethane cover. When forming the polyurethane cover, the polyurethane cover is formed with a multiplicity of dimples at the surface thereof.

As described above, when forming the dimples at the surface of the solid core, it is preferable to form the dimples of the polyurethane cover at the same locations where the dimples are formed at the surface of the solid core. If the concavity and convexity (dimples) are formed at the both surfaces of the solid core and the mold, since the solid core is fixed during the formation of the polyurethane cover, it becomes easier to make the thickness of the polyurethane cover constant, compared with the case that the solid core has no concavity and convexity on the surface thereof. Further, the golf ball of the present invention is usually provided with a paint finish, a marking stamp, or the like when launched into the market in order to enhance the attractiveness and commercial value.

The golf ball configured as described above, preferably has the deformation amount of at least 2.20 mm, more preferably at least 2.30 mm, and the deformation amount of not more than 3.50 mm, more preferably not more than 3.30 mm when applying a load from 98N(10 kgf) as an initial load to 1275 N (130 kgf) as a final load to the golf ball. If the deformation is less than 2.20 mm, the golf ball becomes excessively hard, resulting in the hard shot feeling. While if the deformation is larger than 3.50 mm, the golf ball becomes excessively soft, resulting in the low resilience. Further, the shot feeling becomes heavy.

EXAMPLE

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Measurement and Evaluation]

1. Pot Life (Seconds)

The isocyanate group terminated polyurethane prepolymer was heated to 80° C., and then mixed with each curing agent which is heated at the predetermined temperature (Curing agent adding temp.) to prepare the polyurethane cover composition. The time period between the time the isocyanate group terminated polyurethane prepolymer and the phenylenediamine derivative were mixed and the time when the viscosity of the polyurethane cover composition reached 20,000 mPa·s (cPs) was measured by using a Brookfield viscosity meter (spindle No.4, 12 rpm).

2. Compression Deformation (mm)

The deformation amount (mm) of the golf balls or the solid cores was measured when applying a load from 98N(10 kgf) as an initial load to 1275 N (130 kgf) as a final load to the golf balls or the solid cores.

3. Shore D Hardness of the Polyurethane Cover

Each of the polyurethane cover compositions was formed into sheets each having a thickness of approximately 2 mm by hot-press-molding. The resulting sheets were stored for 2 weeks at 23° C. At least three of the resulting sheets were stacked one upon another, so as to avoid being affected by the measuring substrate on which the sheets were placed, and the stack were subjected to the measurement using a spring-type Shore D hardness tester stipulated in ASTM-D2240.

4. Repulsion Index

Each golf ball was struck with a 198.4 g aluminum cylinder at the speed of 45 m/sec., the speed of the cylinder and the golf ball were respectively measured before and after being struck, and the repulsion coefficient of the each golf ball was calculated based on the speeds and weight of the cylinder and the golf balls. The measurement was carried out 5 times, and the average of 5 times was regarded as the repulsion coefficient of the golf ball. The repulsion coefficient of the golf ball was represented as an index relative to the repulsion coefficient of the golf ball No. 12 which is represented as 100. The larger repulsion index means the higher resilience.

5. Spin Rate (rpm)

Each golf ball was hit with a titanium driver (W#1) attached to a swing robot manufactured by Golf laboratory Co. at the head speed of 45 m/sec., and the spin rate (rpm) was determined by taking a photograph of the spinning golf ball two times.

Each golf ball was hit with a sand wedge club attached to a swing robot manufactured by Golf laboratory Co. at the head speed of 21 m/sec., and the spin rate (rpm) was determined by taking a photograph of the spinning golf ball two times.

6. Flight Distance (m)

Each golf ball was hit with a titanium driver (W#1) attached to a swing robot, at the head speed of 45 m/sec. The flight distance from the hitting point to the point where the golf ball fell to the ground was measured.

7. Abrasion Resistance

Each golf ball was hit with a commercially available pitching wedge attached to a swing robot at the head speed of 36 m/sec. The conditions of the golf ball thus hit was visually observed and rated on three levels according to the following criteria.

Rating Criteria:

"E(Excellent)": The surface of the golf ball had few scratches.

"G(Good)": The surface of the golf ball had a few scratches, which were at an unnoticeable degree;

"P(Poor)": The surface of the golf ball was considerably shaved and conspicuously napped.

8. Coloring-resistance Against Weather

Each golf ball was subjected to the weather-resistance test by using "Sunshine Super Long life Weather Meter" manufactured by Suga Test Instruments Co., LTD., according to JIS D 0205 under the conditions: chamber temperature=63° C., humidity=50%, irradiation=60 hours, and 12 minutes' rainfall per 60 minutes. The "L", "a", and "b" values of the color tone of the golf ball before and after the weathering test were measured by using color meter ("CR-221 manufactured by Minolta Co.). The color difference was calculated according to the following equation.

$$\Delta E^*ab = [(\Delta L^*)^2 + (\Delta a^*)^2 + (\Delta b^*)^2]^{1/2}$$

The lager value of $\Delta E^*ab$ indicates the larger difference of the color tone.

Manufacture of the Golf Ball

1. Production of the Solid Core.

The rubber composition shown in Table 2 was vulcanized and formed at 160° C. for 20 minutes to obtain the solid core having a diameter of 41.2 mm and a weight of 40.9 g. The compressive deformation amount of the solid core was 2.83 mm.

TABLE 2

| Raw material | Part by mass |
| --- | --- |
| Butadiene Rubber | 100 |
| Zinc acrylate | 36 |
| Zinc oxide | 10.4 |
| Dicumyl peroxide | 0.7 |
| Diphenyl disulfide | 0.5 |

Note on Table 2:
Butadiene rubber: BR-18(cis content:96%) available from JSR Co.
Zinc acrylate: "ZNDA-90S" produced by NIHON JYORYU KOGYO Co, .LTD.
Zinc oxide: "Ginrei R" produced by Toho-Zinc Co.
Diphenyl disulfide: Diphenyl disulfide produced by Sumitomo Seika Chemicals Co, .LTD
Dicumyl peroxide: "Percumyl D" produced by NOF corporation.

2. Production of the Polyurethane Cover

As shown in tables 3 and 4, the isocyanate group terminated polyurethane prepolymer heated at 80° C. were mixed with each curing agent heated at the predetermined temperature (Curing agent adding temperature) to prepare a polyurethane cover composition.

Each core obtained above was held in the hemispherical mold, and then the polyurethane cover composition was charged into the hemispherical mold. The hemispherical mold was inverted to mate with another hemispherical mold (having a convexity for forming dimples), into which the same polyurethane cover composition had been charged. Then, the polyurethane cover composition was cured to form the polyurethane cover at 80° C. for 30 minutes. After curing the polyurethane-cover composition, the obtained golf ball was discharged from the mold, deburred, painted with a white paint at the surface, and then painted with a clear coating to obtain two-piece golf balls having a diameter of 42.8 mm and a weight of 45.2 to 45.7 g. The obtained golf balls were evaluated in terms of the compressive deformation amount, repulsion index, abrasion-resistance, flight distance, spin rate, and shot feeling. The results were also shown in Tables 3 and 4. In tables, the amount of the formulation was shown by mass parts. Furthermore, the details of the isocyanate group terminated polyurethane prepolymer and curing agents, which were used, are summarized below.

Adiprene LW520: dicyclohexylmethanediisocyanate (Hydrogenated MDI)-PTMG isocyanate group terminated polyurethane prepolymer having more than 0.5% of free Hydrogenated MDI and NCO content of 4.8%, available from Uniroyal Co.

Adiprene LW570: dicyclohexylmethanediisocyanate (Hydrogenated MDI)-PTMG isocyanate group terminated prepolymer having more than 0.5% of free Hydrogenated MDI and NCO content of 7.5%, available from Uniroyal Co.

Urethane prepolymer A: IPDI-PTMG isocyanate group terminated polyurethane prepolymer having more than 0.5% of free IPDI and NCO content of 8.0%.

Urethane prepolymer B: IPDI-PTMG isocyanate group terminated polyurethane prepolymer having more than 0.5% of free IPDI and NCO content of 12.0%.

Adiprene LF950A: Toluenediisocyanate(TDI)-PTMG isocyanate group terminated polyurethane prepolymer having more than 0.1% of free TDI and NCO content of 6.1%, available from Uniroyal Co.

Vibrathane B635: 4,4'-diphenylmethanediisocyanate (MDI)-PTMG isocyanate group terminated polyurethane prepolymer having more than 0.5% of free MDI and NCO content of 7.8%, available from Uniroyal Co.

Bay-Tec 110: Mixture of diethyltoluenediamine and propylene carbonate, having an amine value of 430 mgKOH/g available from Bayer. (Curing agent adding temperature: 30° C.)

Curehard MED: 3,3'-diethyl-5,5'-dimethyl-4,4'-diaminodiphenylmethane having an amine value of 398 mgKOH/g, available from IHARA CHEMICAL INDUSTRY Co., LTD. (Curing agent adding temperature: 100° C.)

VersalinkP-250: Polytetramethyleneoxide-di-paraamino benzoate having an amine value of 250 mgKOH/g produced by Air products Co. (Curing agent adding temperature: 60° C.)

Ethacure 100: 3,5-diethyltoluenediamine having an amine value of 630 mgKOH/g, available from Albemalre Co. (Curing agent adding temperature: 30° C.)

Ethacure 300: 3,5-dimethylthiotoluenediamine having an amine value of 530 mgKOH/g, available from Albemalre Co; (Curing agent adding temperature: 30° C.)

LONZACURE M-CDEA: 4,4'-methylenebis(3-chloro-2,6'-diethylaniline) having an amine value of 297 mgKOH/g, available from Lonza Co. (Curing agent adding temperature: 100° C.)

TABLE 3

| Golf ball No. | 1 | 2 | 3 | 4 | 5 | 6 |
|---|---|---|---|---|---|---|
| Polyurethane cover composition | | | | | | |
| NCO terminated Pu prepolymer | | | | | | |
| Adiprene LW520 | 75 | 50 | — | — | — | — |
| Adiprene LW570 | 25 | 50 | — | — | — | — |
| Urethane prepolymer A | — | — | 100 | 100 | 100 | — |
| Urethane prepolymer B | — | — | — | — | — | 100 |
| Curing agent | — | — | — | — | — | — |
| Bay-Tec 110 (30° C.) | 16.1 | 18.1 | 23.5 | — | — | 29.37 |
| Ethacure 100 (30° C.) | — | — | — | 16.2 | — | — |
| 2,4,6-trimethyl-m-phenylenediamine (60° C.) | — | — | — | — | 13.6 | — |
| Titanium oxide | 2 | 2 | 2 | 2 | 2 | 2 |
| Pot life(sec.) | 520 | 480 | 120 | 100 | 70 | 90 |
| Shore D harness | 43 | 46 | 43 | 45 | 44 | 51 |
| Properties of Golf ball | | | | | | |
| Deformation amount(mm) | 2.76 | 2.72 | 2.70 | 2.69 | 2.70 | 2.65 |
| Repulsive Index | 103 | 104 | 105 | 105 | 104 | 106 |
| Flight distance(m)/W#1 | 235 | 235 | 236 | 236 | 235 | 237 |
| Spin rate(rpm)/W#1 | 2940 | 2960 | 3030 | 2990 | 3040 | 2920 |
| Spin rate(rpm)/SW | 6710 | 6650 | 7060 | 6860 | 6940 | 6920 |
| Abrasion resistance | E | E | G | G | G | G |
| Coloring resistance(ΔE) | 4.8 | 5.2 | 4.2 | 4.5 | 4.4 | 4.4 |

Golf ball Nos.1 to 6 used the polyurethane cover composition which includes the isocyanate group terminated polyurethane prepolymer containing at least one diisocyanate selected from the group consisting of 4,4'-dicyclohexylmethanediisocyanate, isophoronediisocyanate and cyclohexanediisocyanate as the polyisocyanate component and the phenylenediamine derivative used in the present invention. The polyurethane cover compositions had pot lives of 70 to 520 seconds. Since the polyurethane cover compositions had suitable pot lives, the workability for covering the solid core with the polyurethane cover was good.

The obtained golf ball was each excellent in resilience, flight distance (235 to 237 m), and abrasion-resistance, coloring-resistance against weather. Especially, the flight distance became very large, because the polyurethane cover having a high resilience was obtained by the use of phenylenediamine derivative as a curing agent, thus the flight performance of the golf ball was improved.

Further, the reason why the color difference was as small as from 4.2 to 5.2 is that the alicylic diisocyanate was used as the polyisocyanate component of the isocyanate prepolymer. In addition, the shot feeling of each golf ball was good.

extremely short pot life. Since the pot life was extremely short, it was also impossible to obtain the golf ball by curing the polyurethane cover composition.

In terms of the golf balls Nos.12 to No.15, the pot life of the polyurethane cover composition ranged from 80 to 300 seconds, which fell within the suitable range. However, since the aromatic polyisocyanate was used as the polyisocyanate component of the isocyanate group terminated polyurethane prepolymer, thus the coloring-resistance was remarkably lowered. Also, in golf balls No.13 and No.14,

TABLE 4

| Golf ball No. | 7 | 8 | 9 | 10 | 11 | 12 | 13 | 14 | 15 |
|---|---|---|---|---|---|---|---|---|---|
| Polyurethane cover composition | | | | | | | | | |
| NCO terminated Pu prepolymer | | | | | | | | | |
| Urethane Prepolymer A | 100 | 100 | 100 | 100 | — | — | — | — | — |
| Vibrathane B635 | — | — | — | — | 100 | 100 | — | — | — |
| Adiprene LF950A | — | — | — | — | — | — | 100 | 100 | 100 |
| Curing Agent | | | | | | | | | |
| Bay-Tec 110 (30° C.) | — | — | — | — | 22.8 | — | 17.9 | — | — |
| Ethacure 100 (30° C.) | — | — | — | — | — | — | — | 6.7 | — |
| Versa link P250 (60° C.) | 40.6 | — | — | — | — | 39.3 | — | — | — |
| Ethacure 300 (30° C.) | — | 19.12 | — | — | — | — | — | 6.7 | — |
| Cure Hard MED (100° C.) | — | — | 25.5 | — | — | — | — | — | — |
| Lonza cure M-CDEA (100° C.) | — | — | — | 34.2 | — | — | — | — | 26.1 |
| Titanium oxide | 2 | 2 | 2 | 2 | 2 | 2 | 2 | 2 | 2 |
| Pot life (sec.) | 2200 | 1050 | 100 | 850 | — | 200 | 80 | 210 | 300 |
| Shore D hardness | — | — | 52 | 51 | — | 46 | 45 | 48 | 52 |
| Properties of Golf ball | | | | | | | | | |
| Deformation amount (mm) | — | — | 2.66 | 2.67 | — | 2.74 | 2.72 | 2.70 | 2.68 |
| Repulsion Index | — | — | 104 | 102 | — | 100 | 102 | 101 | 101 |
| Fight distance (m)/W#1 | — | — | 234 | 231 | — | 225 | 232 | 229 | 230 |
| Spin rate (rpm)/W#1 | — | — | 3030 | 3100 | — | 3320 | 3160 | 3120 | 3060 |
| Spin rate (rpm)/SW | — | — | 6700 | 6530 | — | 6740 | 6640 | 6600 | 6570 |
| Abrasion resistance | — | — | G | G | — | P | G | G | G |
| Coloring resistance (ΔE) | — | — | 3.4 | 3.2 | — | 5.8 | 7.6 | 8.3 | 7.0 |

In golf ball Nos. 7 to 10, the curing agents other than the phenylenediamine derivative used in the present invention were used for the polyurethane cover composition. In golf balls No.7 and 8, the reactivity of the curing agent to the isocyanate group terminated polyurethane prepolymer used in the present invention was so low, thus the pot life of the polyurethane cover composition was long. As a result, it was impossible to obtain the golf ball by curing the polyurethane cover composition.

Golf balls Nos. 9 and 10 are the cases using 4,4'-diaminodiphenylmethane derivative as a curing agent. Although golf ball Nos. 9 and 10 were excellent in abrasion-resistance and coloring-resistance against weather, flight distances were lowered to 231 to 234 m, due to the low resilience of the polyurethane cover. Golf ball No. 11 and 13 were the cases where the aromatic polyisocyanate was used as the polyisocyanate component of the isocyanate group terminated polyurethane prepolymer in combination with the phenylenediamine derivative used in the present invention.

Especially for Golf ball No.11, the reactivity of amino group of the curing agent to the isocyanate group was too high, thus the pot life could not be measured, due to the the flight distance was lowered because toluenediisocyanate was used as the polyisocyanate component of the isocyanate prepolymer.

The golf ball of the present invention provides an excellent coloring-resistance against weather, since the specified polyisocyanate is used as the polyisocyanate component of the isocyanate group terminated polyurethane prepolymer. Further, the productivity of the golf ball was improved by controlling the pot life of the polyurethane cover composition, with the use of the specified phenylenediamine derivative as the curing agent for the isocyanate group terminated polyurethane prepolymer. Furthermore, since the phenylenediamine derivative provides the resultant polyurethane cover with the high resilience, the obtained golf ball was excellent in the flight distance.

This application is based on Japanese Patent application No.2002-177592 filed on Jun. 18, 2002, the contents of which are hereby incorporated by reference.

What is claimed is:

1. A golf ball having a polyurethane cover, wherein the polyurethane cover is formed by curing a polyurethane cover composition which comprises:

an isocyanate group terminated polyurethane prepolymer comprising at least one diisocyanate selected from the group consisting of 4,4-dicyclohexylmethane-
diisocyanate, isophoronediisocyanate, and cyclohex-
anediisocyanate as a polyisocyanate, component; and
a phenylenediamine derivative represented by the follow-
ing formula (1):

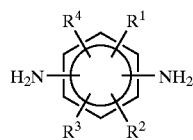

(1)

wherein $R^1$ to $R^4$ represent any one of an alkyl group having
1 to 3 carbons, or hydrogen atom, and each of $R^1$ to $R^4$ may
be the same as or different from the other; and
wherein the polyurethane cover further contain propylene
carbonate.

2. The golf ball according to claim 1, wherein the poly-
urethane cover composition has a pot life of 30 to 1,000
seconds.

3. The golf ball according to claim 1, wherein the phe-
nylenediamine derivative is trialkylphenylenediamine.

4. The golf ball according to claim 1, wherein the phe-
nylenediamine derivative is a mixture of 2,4-diethyl-6-
methyl-1,3-phenylenediamine and 4,6-diethyl-2-methyl-1,
3-phenylenediamine.

5. The golf ball according to claim 1, wherein the poly-
urethane cover has a Shore D hardness of from 30 to 60.

6. The golf ball according to claim 1, wherein the poly-
urethane cover has a thickness of 0.2 mm to 1.5 mm.

7. A two-piece golf ball having a solid core and a
polyurethane cover covering the solid core, wherein the
polyurethane cover is formed by curing a polyurethane
cover composition which comprises:
an isocyanate group terminated polyurethane prepolymer
comprising at least one diisocyanate selected from the
group consisting of 4,4'-dicyclohexylmethane-
diisocyanate, isophoronediisocyanate, and cyclohex-
anediisocyanate as a polyisocyanate component; and
a phenylenediamine derivative represented by the follow-
ing formula (1):

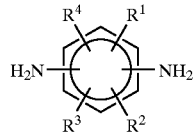

(1)

wherein $R^1$ to $R^4$ represent any one of an alkyl group having
1 to 3 carbons, or hydrogen atom, and each of $R^1$ to $R^4$ may
be the same as or different from the other; and
wherein the polyurethane cover further contain propylene
carbonate.

8. The golf ball according to claim 7, wherein the poly-
urethane cover composition has a pot life of 30 to 1,000
seconds.

9. The golf ball according to claim 7, wherein the phe-
nylenediamine derivative is a mixture of 2,4-diethyl-6-
methyl-1,3-phenylenediamine and 4,6-diethyl-2-methyl-1,
3-phenylenediamine.

10. The golf ball according to claim 7, wherein the
polyurethane cover has a Shore D hardness of from 30 to 60,
and a thickness of 0.2 mm to 1.5 mm.

11. The golf ball according to claim 7, wherein the solid
core is formed by vulcanizing a rubber composition which
comprises:

a base rubber;
an organic peroxide;
a co-crosslinking agent; and
a diphenyl disulfide derivative represented by the follow-
ing formula (5):

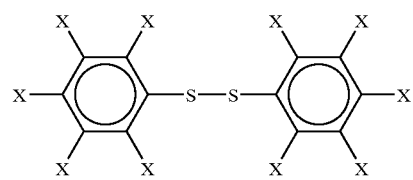

(5)

wherein X represents any one selected from the group
consisting of a hydrogen atom, a fluorine atom, a chlorine
atom, a bromine atom, an iodine atom, and a cyano group,
and each of X may be same as or different from other.

12. A multi-piece golf ball having:
a solid core including a center and at least one interme-
diate layer covering the center; and
a polyurethane cover covering the solid core, wherein the
polyurethane cover is formed by curing a polyurethane
cover composition which comprises:
an isocyanate group terminated polyurethane prepolymer
comprising at least one diisocyanate selected from the
group consisting of 4,4'-dicyclohexylmethane-
diisocyanate, isophoronediisocyanate, and cyclohex-
anediisocyanate as a polyisocyanate component; and
a phenylenediamine derivative represented by the follow-
ing formula (1):

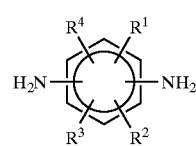

(1)

wherein $R^1$ to $R^4$ represent any one of an alkyl group having
1 to 3 carbons, or hydrogen atom, and each of $R^1$ to $R^4$ may
be same as or different from the other; and
wherein the polyurethane cover further contains propy-
lene carbonate.

13. The golf ball according to claim 12, wherein the
polyurethane cover composition has a pot life of 30 to 1,000
seconds.

14. The golf ball according to claim 12, wherein the
phenylenediamine derivative is a mixture of 2,4-diethyl-6-
methyl-1,3-phenylenediamine and 4,6-diethyl-2-methyl-1,
3-phenylenediamine.

15. The golf ball according to claim 12, wherein the
polyurethane cover has a Shore D hardness of from 30 to 60,
and a thickness of 0.2 mm to 1.5 mm.

16. The golf ball according to claim 12, wherein the center
is formed by vulcanizing a rubber composition comprising:
a base rubber;
an organic peroxide;
a co-crosslinking agent; and a diphenyl disulfide derivative represented by the following formula (5):

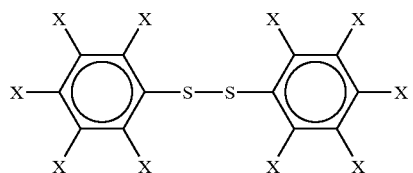

(5)

wherein X represents any one selected from the group consisting of a hydrogen atom, a fluorine atom, a chlorine atom, a bromine atom, an iodine atom, and a cyano group, and each of X may be same as or different from other.

17. The golf ball according to claim 12, wherein the intermediate layer comprises at least one selected from the group consisting of an ionomer resin, a polyester elastomer, a polyurethane elastomer, a polystyrene elastomer, and a polyamide elastomer, and has a Shore D hardness of from 30 to 75.

* * * * *